W. J. QUINN.
LIFTING DEVICE.
APPLICATION FILED JULY 31, 1920.

1,378,900.

Patented May 24, 1921.

WITNESS:

INVENTOR
William J. Quinn
BY
ATTORNEY.

UNITED STATES PATENT OFFICE.

WILLIAM J. QUINN, OF WESTGROVE, PENNSYLVANIA.

LIFTING DEVICE.

1,378,900.        Specification of Letters Patent.     Patented May 24, 1921.

Application filed July 31, 1920. Serial No. 400,343.

*To all whom it may concern:*

Be it known that I, WILLIAM J. QUINN, a citizen of the United States, residing at Westgrove, county of Chester, and State of Pennsylvania, have invented a new and useful Improvement in Lifting Devices, of which the following is a full, clear, and exact description, reference being had to the accompanying drawings, which form a part of this specification.

This invention relates to an improvement in lifting devices, and more particularly to lifting devices for raising the bodies of dump wagons when dumping.

The object of my invention is to provide a slow pitch screw actuating device which is arranged to be rotated in either direction by a power driven shaft, adapted to be connected to the screw through reversing mechanism of a clutch, to raise and lower said screw. A further object of my invention is to provide a friction bearing for the nut together with means for connecting the screw to the lead to lift the load and also to prevent the rotation of the screw by the actuating nut.

The precise nature of my invention will be best understood by reference to the drawings which will now be described, it being premised, however, that the details of construction may be changed, without departing from the spirit and scope of my invention, as defined in the appended claims.

Figure 1 of the drawings is a side elevation, partially in section, of one form of my improved device.

Figure 1:
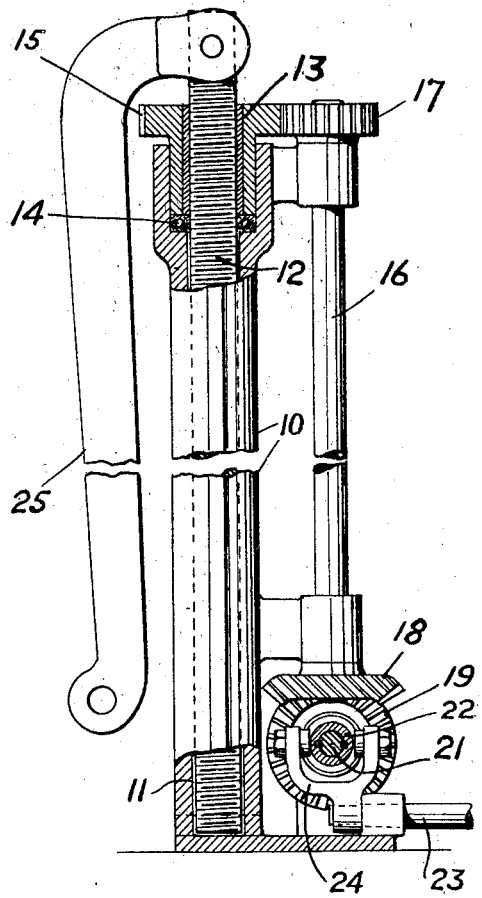
Figure 2:
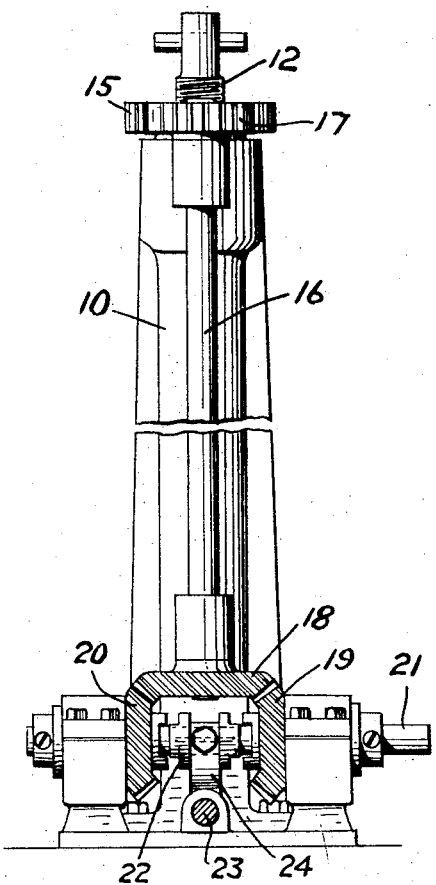
Fig. 2 is a front view thereof.
Figure 3:
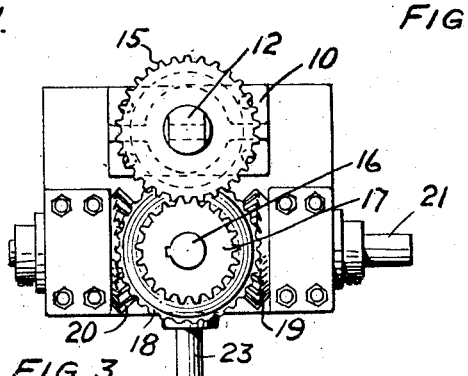
Fig. 3 is a plan view.

In these drawings the reference character 10 designates a frame having a cylindrical chamber 11 therein. 12 is a screw having a slow pitch thread thereon, which is slidably mounted in the chamber and has a threaded engagement with a nut 13. This nut 13 is rotatably mounted in a bearing formed in the upper end of the chamber 11 and rests on ball bearings 14. The nut 13 in this case is formed of an inner shell connected to an outer shell, and which outer shell has a gear wheel 15 formed integrally with the upper end thereof. Mounted for rotation in bearings on the frame 10, and parallel with the screw 12, is a shaft 16, having a pinion 17 on the upper end thereof in mesh with the gear wheel 15. 18 is a miter gear connected to the lower end of the shaft 16 and which is in mesh with miter gears 19 and 20. These miter gears are free to rotate on a shaft 21 journaled in bearings on the frame 10, and which is arranged to be driven from any suitable source. The gears 19 and 20 are each provided with clutch members which are arranged to be engaged by complementary members on a clutch 22, which is splined to the shaft 21, and is arranged to be moved along the shaft to connect either of the gears 19 and 20 with the driving shaft to rotate the nut 13.

23 is a rock shaft journaled in bearings on the frame 10, and which is connected to a clutch fork 24 for shifting the clutch when the shaft 23 is rocked.

The screw 12 is arranged to be connected to the load to be lifted in any desired manner, so that the screw is held against rotation by the load. In this specific form the load lifting device consists of link 25, of goose-neck form, the upper end of which is pivotally connected to the end of the screw, while the lower end thereof is pivotally connected to the load to be lifted.

In order to lift the load, the clutch 22 is shifted to connect the nut 13 to the shaft 21 to rotate the nut and thereby raise the screw and the load connected thereto, and when the load has been raised to the predetermined height, the clutch is shifted to disconnect the gearing from the shaft. As the screw has a slow pitch, the load will be maintained without the use of a brake or other locking means.

The device may be connected to a motor truck having a dump body, and in which case the shaft 21 may be driven by the truck motor.

Having now fully described my invention, what I claim and desire to protect by Letters Patent is:

1. A load lifting device comprising a screw, a lifting device pivoted to the lifting screw at one end, means for connecting the other end of the load lifting device to lift the load and to restrain the screw against rotation by the load to be lifted, a nut for raising the screw, a driving shaft parallel with the shaft, gearing connecting the shaft to the nut, and power actuated means arranged to be connected and disconnected with said shaft.

2. A load lifting device comprising a housing, a screw movably mounted therein, a lifting device pivoted to the lifting screw at one end, means for connecting the other end of the load lifting device to lift the load and to restrain the screw against rotation by the load to be lifted, a nut for raising the screw rotatably mounted in the housing, a driving shaft parallel with the screw rotatably mounted in the housing, a bevel gear on said shaft, a driving shaft, oppositely disposed gears on said shaft meshing with said first bevel gear, and a clutch for connecting either of the oppositely disposed gears with the shaft.

In testimony of which invention, I have hereunto set my hand, at Westgrove, Pa., on this 29th day of July, 1920.

WILLIAM J. QUINN.